United States Patent [19]

Shimogawa et al.

[11] 3,965,050

[45] June 22, 1976

[54] PROCESS FOR PREPARING CROSS-LINKED ELASTOMER COMPOSITIONS AND COMPOSITIONS CURABLE WITH CROSS-LINKING AGENTS USED THEREFOR

[75] Inventors: Sachio Shimogawa; Takashi Fujio, both of Amagasaki; Mikio Arika, Nishinomiya; Nobuo Yamada, Amagasaki; Takashi Kodama, Itami; Tetsuya Nakata, Ibaragi, all of Japan

[73] Assignee: Osaka Soda Co., Ltd., Osaka, Japan

[22] Filed: June 3, 1974

[21] Appl. No.: 475,771

[52] U.S. Cl. .............................. 260/2 A; 252/393; 260/45.7 R; 260/77
[51] Int. Cl.² ................ C08G 65/32; C08L 19/00; C08J 3/24
[58] Field of Search ............ 260/2 A, 45.7 R, 79 R; 252/393

[56] References Cited
UNITED STATES PATENTS

| | | | |
|---|---|---|---|
| 3,341,491 | 9/1967 | Robinson | 260/45.75 |
| 3,624,029 | 11/1971 | Inagami et al. | 260/45.9 R |
| 3,700,650 | 10/1972 | Hani et al. | 260/79 |
| 3,790,524 | 2/1974 | Saito et al. | 260/45.8 N |
| 3,801,517 | 4/1974 | Richwine | 260/2 A |
| 3,822,241 | 7/1974 | Hani et al. | 260/79 |

*Primary Examiner*—Donald E. Szaja
*Assistant Examiner*—E. A. Nielsen
*Attorney, Agent, or Firm*—Sherman & Shalloway

[57] ABSTRACT

Improved process for preparing a cross-linked epichlorohydrin elastomer composition by heating an epichlorohydrin elastomer in the presence of a compound selected from the group consisting of the quinones and derivatives thereof of the following formula

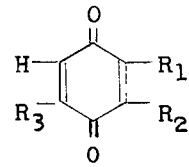

wherein $R_1$, $R_2$ and $R_3$, which may be the same or different, are each a member selected from the class consisting of hydrogen and the hydrocarbon groups, and $R_1$ and $R_2$ taken together, may form a benzene ring.

7 Claims, No Drawings

PROCESS FOR PREPARING CROSS-LINKED ELASTOMER COMPOSITIONS AND COMPOSITIONS CURABLE WITH CROSS-LINKING AGENTS USED THEREFOR

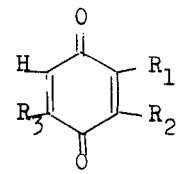

This invention relates to a process of preparing cross-linked products comprising carrying out the cross-linking reaction by heating together a cross-linking agent and a composition containing an elastomer consisting of either a homopolymer or copolymer of epichlorohydrin. This process surmounts the usual disadvantages involving the contamination or corrosion of the molds used for cross-linking molding or other metallic vessels used for the cross-linking (or vulcanization) as well as the corrosion or rusting by the resulting cross-linked product of metallic members coming into contact therewith. The invention thus relates to a cross-linking process which can inhibit the appearance of such phenomena as contamination, corrosion and rusting of the foregoing molds, metallic vessels and metallic members.

It is well known that epichlorohydrin elastomer compositions, on being cross-linked (or vulcanized), become rubbery materials excelling in thermal resistance and resistance to oil. However, it is also known that in cross-link molding the epichlorohydrin elastomer composition, this composition contaminates or corrodes metallic items such as the molds that are used, and further that in using the resulting cross-linked product in contact with metallic members these members are corroded or rusted by the cross-linked product. In consequence, the use to which the resulting cross-linked rubbery material can be applied is greatly restricted, notwithstanding the excellence of its properties.

The reason why this unfavorable phenomenon occurs is not clarified as yet, but it is believed that the cause is not only ascribable to the disadvantages that are inherently possessed by the epichlorohydrin homo- or copolymer but also due to the method of vulcanization and other complications. In the past, it has been suggested for inhibiting such a phenomenon to cross-link an epichlorohydrin elastomer composition in which has been incorporated a metal salt of a naphthalenesulfonic acid derivative such as barium dinonylnaphthalenesulfonate (Japanese Patent Publication No. 44340/72). However, the effects obtained were not entirely satisfactory. Furthermore, the foregoing metal salts must be incorporated, say, in an amount of about 10 % by weight or more, or else even these unsatisfactory effects cannot be achieved to an extent as to be discernible. Further, there were numerous disadvantages from the standpoint of the cross-linking operations as well as the physical properties of the resulting product, such as a decline in the vulcanization speed, aggravation of the thermal resistance of the resulting cross-linked product, and the setting up of a permanent strain resulting from compression. Hence, the product was utterly unsatisfactory for practical use.

In consequence of our research with a view to providing a cross-linking process which could overcome the disadvantages such as contamination, corrosion and rusting, we found that superior results in preventing the undesirable phenomena were obtained by using quinones or the derivatives thereof of the formula (1)

wherein $R_1$, $R_2$ and $R_3$, which may be the same or different, are each a member selected from the group consisting of hydrogen and hydrocarbon groups, $R_1$ and $R_2$, taken together, may form a benzene ring. The foregoing compounds have never been used as rustproofing agents nor have they been incorporated in epichlorohydrin elastomer compositions for other purposes. It was further found that the foregoing compounds could be used without the attendant disadvantages from the standpoint of operations and the physical properties of the resulting product, such as a marked decline in the vulcanization speed, a decline in the thermal resistance and the setting up of a permanent strain.

It is therefore an object of this invention to provide an improved process for preparing cross-linked epichlorohydrin elastomer compositions.

Another object of the invention is to provide epichlorohydrin elastomer compositions which are curable by the cross-linking agents used in practicing such a process.

Other objects and advantages of the present invention will become apparent from the following description.

The epichlorohydrin polymers used in the present invention include, in addition to the epichlorohydrin homopolymer, the copolymers of epichlorohydrin and other olefin oxides, and the mixtures of the foregoing homopolymer and copolymer or of the different copolymers. As specific examples, mention can be made of the known polymers such as epichlorohydrin homopolymer, epichlorohydrin-ethylene oxide copolymer, epichlorohydrin-propylene oxide copolymer epichlorohydrin-butylene oxide copolymer, epichlorohydrin-allyl glycidyl ether copolymer, epichlorohydrin-ethylene oxide-allyl glycidyl ether copolymer and epichlorohydrin-epibromohydrin copolymer, as well as optional mixtures of these polymers.

Of the compounds of formula (1) used in this invention, preferred are those in which at least one of the groups $R_1$, $R_2$ and $R_3$ is hydrogen. Again, when one or more of the groups $R_1$, $R_2$ and $R_3$ are hydrocarbon groups, it is preferred that the group or groups are $C_1$ – $C_{20}$ alkyl groups, which may be either a straight chain or branched group. As specific examples of these compounds of formula (1), mention can be made of such compounds as 1,4-benzoquinone, 2,5-dimethyl-p-benzoquinone, methyl-p-benzoquinone, 2,3-dimethyl-p-benzoquinone, 2,5-dimethyl-p-benzoquinone, 2,6-dimethyl-p-benzoquinone, 2,3,5-trimethyl-p-benzoquinone, 2,5-dibutyl-p-benzoquinone, 2,6-dibutyl-p-benzoquinone, octyl-p-benzoquinone and stearyl-p-benzoquinone. Examples of the compounds in which $R_1$ and $R_2$, taken together, form a benzene ring, include 1,4-naphthoquinone and 2-methyl-1,4-naphthoquinone.

According to this invention, in carrying out the cross-linking reaction by heating the epichlorohydrin elastomer composition in the presence of a cross-linking agent, the reaction is also carried out in the presence of a quinone or a derivative thereof of the foregoing formula (1). As the cross-linking agent for use with the epichlorohydrin elastomer, various compounds are known. Any of these known cross-linking agents can be suitably chosen and used, there being no particular restriction in the case of the present invention. Specific examples of these known cross-linking agents include the following: the combinations of a thiourea derivative such as trimethylthiourea or 2-mercaptoimidazoline and a metal compound such as red lead, magnesia or zinc white; the polyamine derivatives such as hexamethylenediamine carbamate; the thiocyanuric acid derivatives and the metal salts thereof; and the metal salts of cyclic dithiocarbamic acid.

In accordance with the present invention, there can be provided a cross-linking agent-cured epichlorohydrin elastomer composition that has incorporated therein usually of the order of 0.2 – 5 parts by weight, preferably 0.5 – 5 parts by weight, and more preferably 0.5 – 3 parts by weight, of the foregoing compound of formula (1) per 100 parts by weight of the epichlorohydrin elastomer. Providing a cross-linked epichlorohydrin elastomer composition by means of the present invention, may be accomplished by carrying out the cross-linking reaction by heating the epichlorohydrin elastomer composition in the presence of a cross-linking agent and the foregoing compound of formula (1). Usually, a heating temperature of about 120° –190°C. can be employed. The heating may be carried out under superatmospheric conditions. The heating time can be suitably varied. In short, the reaction need only be carried out to an extent that the desired degree of cross-linking is achieved. If desired, it is possible to carry out a preliminary cure and then a postcure.

The epichlorohydrin elastomer composition used in this invention may contain various additives known in the art in addition to the cross-linking agent and the compound of formula (1). Examples include inorganic fillers or reinforcing agents such as carbon, silica, carbonates and silicates; metal salt stabilizers or accelerators including metal oxides such as magnesia, zinc white, quicklime, barium oxide and lead oxide, the phosphites and basic phosphites of such metals as magnesium and lead, the carboxylates or basic carboxylates of such metals as calcium, magnesium and lead, and the basic carbonates of such metals as lead; organic acceptors of hydrogen halides or halogens such as acrylic acid, crotonic acid, isocrotonic acid, sorbic acid and cinnamic acid; age resisters such as phenolic compounds, amino compounds, mercapto compounds, phosphorous acid esters and dithiocarbamates; plasticizers; lubricants; and pigments. These additives may be used in amounts known in the art. For instance, on the basis of 100 parts by weight of the epichlorohydrin elastomer, the inorganic fillers or reinforcing agents can be used in an amount of about 1 to about 100 parts by weight, the stabilizers or accelerators can be used in an amount of about 1 to about 50 parts by weight, the organic acid acceptors can be used in an amount of about 0.1 to about 5 parts by weight, the age resisters can be used in an amount of about 0.1 to about 5 parts by weight, the plasticizers can be used in an amount of about 1 to about 100 parts by weight, the lubricants can be used in an amount of about 0.1 to 10 parts by weight, and the pigments can be used in an amount of about 0.1 to 20 parts by weight.

In this invention there is no particular restriction as to the procedure by which the foregoing compound of formula (1) is incorporated in the epichlorohydrin elastomer composition, it being permissible to add the compound of formula (1) either before, at the same time or after the above-described other additives have been incorporated. The mixing may be accomplished by means of mixing rolls, a Banbury mixer, etc. The compound of formula (1) also may be added as a solution.

The following examples and control experiments are given for illustrating the effects of the present invention. The effects of inhibiting the corrosion of molds or metals were tested in the following manner.

Test 1. Corrosion of molds.

The composition to be vulcanized is sandwiched between two plates which are hard chromium gilt in 10-micron thickness, and the assembly is heated at 160°C. under a pressure of 80 kg/cm². This procedure is repeated at intervals of 30 minutes, renewing the sample composition on each occasion, examination being made of the appearance of pinholes due to corrosion with the naked eye. The number of repetitions made until the appearance of pinholes is used to indicate the corrosion inhibiting effect.

Test 2. Corrosion of metals by the cross-linked product.

Three samples of the vulcanized product of 2 × 3 centimeter size prepared by carrying out the vulcanization for 30 minutes at 155°C. are sandwiched intimately between two sheets of rolled sheet steel of the type specified in the JIS Method G-3141. These sheets are washed in acetone before use. The assembly is then allowed to stand still for a prescribed number of hours in a vessel saturated with steam, after which the state of rust or corrosion appearance is evaluated by classification into the following ten grades. The period of time the assembly is left standing in the steam-saturated vessel is indicated in the examples.

| Grade | Criterion of evaluation |
|---|---|
| 0 | Possesses luster, there being noted no clouding, rusting or corrosion at all. |
| 1 | Trace amount of clouding due to the vulcanized product is noted. |
| 2 | Slight clouding due to the vulcanized product is noted. |
| 3 | Medium degree of clouding due to the vulcanized product is noted. |
| 4 | Very slight amount of rusting is noted in that portion of the sheet steel surrounding the place where the vulcanized product was in contact. |
| 5 | Slight rusting or corrosion is noted in that portion of the sheet steel surrounding the place where the vulcanized product was in contact. |
| 6 | Medium degree of rusting or corrosion is noted in that portion of the sheet steel surrounding the place where the vulcanized product was in contact. |
| 7 | Slight rusting or corrosion is noted over the whole of the area of the sheet steel where the vulcanized product was in contact. |
| 8 | Medium degree of rusting or slight corrosion is noted over the whole of the area of the sheet steel where the vulcanized product was in contact. |
| 9 | Excessive corrosion is noted over the whole of the area of the sheet steel where the vulcanized product was in contact. |

Examples 1 – 3 and Control 1

| | |
|---|---|
| CHR*¹ | 100 Parts by weight |
| Zinc stearate | 1 |
| 2-mercaptoimidazoline*² | 1.5 |

| -continued | |
|---|---|
| Red lead | 5 |
| FEF carbon*3 | 50 |
| Nickel dibutyldithiocarbamate*4 | 1 |
| Quinone | 0.5 |

*1 Epichlorohydrin homopolymer (HYDRIN 100 of Goodrich Company)
*2 Nocceller-22 of Ouchi Shinko Kagaku Kogyo Kabushiki Kaisha, Japan
*3 Seast 116 of Tokai Denkyoku Co., Ltd., Japan
*4 Nocrac NBC of Ouchi Shinko Kagaku Kogyo Kabushiki Kaisha, Japan The above composition was mixed for 30 minutes with 85° – 75°C. mixing rolls and made into a sheet followed by placing in a mold where it was molded for 30 minutes at 150°C. and 80 kg/cm² to obtain a vulcanized product having a thickness of 2 millimeters. The results of the corrosion test conducted to test the composition's corrosion of the mold (the number of press repetition until pinholes appear) and the results of the test conducted to test the molded product's corrosion of metal are shown in Table 1.

Table 1

| Quinone | | Control 1 not added | Example 1 p-benzo-quinone | Example 2 1,4-naph-thoquinone | Example 3 2,5-dimethyl-p-benzoquinone |
|---|---|---|---|---|---|
| TB kg/cm² | | 145 | 130 | 130 | 130 |
| EB % | | 300 | 370 | 400 | 400 |
| PS % | | 3.2 | 5.3 | 8.6 | 8.0 |
| H Shore A | | 80 | 82 | 78 | 75 |
| Test 1 | Number of press repetitions until pinholes appear | ~10 | >>20 | >>20 | >>20 |
| Test 2 | Degree of corrosion (standstill time=100hrs.) | 6 | 1 | 2 | 1 |

Note
TB = Tensile strength at break
EB = Elongation at break
PS = Permanent stretch
H = Hardness Examples 4 and 5 and Control 2

| | |
|---|---|
| CHC*5 | 100 Parts by weight |
| Zinc stearate | 1 |
| 2-mercaptoimidazoline*2 | 1.5 |
| Red lead | 5 |
| FEF carbon*3 | 50 |
| Nickel dibutyldithiocarbamate*4 | 1 |
| Quinone | 1.5 |

*5 Epichlorohydrin-ethylene oxide copolymer (HYDRIN 200 of Goodrich Company)

The above composition was molded as in the previous examples. The physical properties of the resulting product and the results of the corrosion test conducted to test the composition's corrosion of the mold as well as the results of the test conducted to test the molded product's corrosion of metals are shown in Table 2.

Table 2

| Quinone | | Control 2 not added | Example 4 p-benzoquinone | Example 5 1,4-naphtho-quinone |
|---|---|---|---|---|
| TB kg/cm² | | 135 | 130 | 125 |
| EB % | | 280 | 360 | 420 |
| PS % | | 3.0 | 8.5 | 10.0 |
| H Shore A | | 80 | 79 | 76 |
| Test 1 | Number of press repetitions until pinholes appear | 4~5 | >15 | >15 |
| Test 2 | Degree of corrosion (standstill time=100hrs.) | 8 | 3 | 4 |

TB = Tensile strength at break
EB = Elongation at break
PS = Permanent stretch
H = Hardness

EXAMPLES 6 – 11 AND CONTROLS 3 – 5

The compositions shown in Table 3 were vulcanized and molded by operating as in the previous examples. The physical properties of the molded products and the degree to which they corrode metals when tested for 100 hours in an atmosphere of 38°C. and 100 % humidity is shown in Table 3.

Table 3

|  |  | Ex. 6 | Ex. 7 | Ex. 8 | Ex. 9 | Ex. 10 | Ex. 11 | Control 3 | Control 4 | Control 5 |
|---|---|---|---|---|---|---|---|---|---|---|
| Composition | CHR*1 | 100 | 100 | 100 | 100 | 100 | 100 | 100 | 100 | 100 |
|  | Tin stearate | 2 | 2 | 2 | 2 | 2 | 2 | 2 | 2 | 2 |
|  | FEF carbon*3 | 40 | 40 | 40 | 40 | 40 | 40 | 40 | 40 | 40 |
|  | Nickel dibutyl-dithiocarbamate*4 | 1 | 1 | 1 | 1 | 1 | 1 | 1 | 1 | 1 |
|  | 2-mercaptoimi-dazoline*2 | 1.5 | 1.5 | 1.5 | 1.5 | 1.5 | 1.5 | 1.5 | 1.5 | 1.5 |
|  | Red lead | 5 | 5 | 5 | 5 | 5 | 5 | 5 | 5 | 5 |
|  | p-benzoquinone | 1 | 1 | not added | not added | not added | not added | not added | not added | not added |
|  | 1,4-naphthoquinone | not added | not added | 1 | 1 | not added | not added | not added | not added | not added |
|  | Cinnamic acid | 0.5 | not added | 0.5 | not added | 0.5 | not added | not added | | |
|  | Sorbic acid | not added | 0.5 | not added | 0.5 | not added | 0.5 | not added | | |
| Physical properties of vulcanized product | Modulus at 300 % kg/cm² | 73 | 70 | 50 | 48 | 49 | 53 | 26 | 115 | 112 |
|  | TB kg/cm | 129 | 130 | 121 | 118 | 124 | 128 | 136 | 130 | 127 |
|  | EB % | 770 | 820 | 950 | 950 | 950 | 950 | 980 | 420 | 480 |
|  | H Shore A | 72 | 70 | 72 | 72 | 72 | 73 | 73 | 74 | 74 |
| Degree of corrosion (Test 2) | 100 hrs. | 1 | 1 | 1 | 0 | 1 | 1 | 1 | 4 | 5 |
|  | 200 hrs. | 2 | 2 | 1 | 2 | 2 | 1 | 4 | 6 | 6 |

EXAMPLES 12 – 17 AND CONTROLS 6 – 11

The degree to which vulcanized molded products having the compositions shown in Table 4 corrodes metals when left standing for 100 hours in an atmosphere of 38°C. and humidity 100 % is shown in said Table 4.

The vulcanized molded products were made by operating in the same manner as described in the previous examples.

We claim:

1. In the process for preparing a cross-linked elastomer composition by heating a mixture of a homopolymer of epichlorohydrin or a copolymer of epichlorohydrin and an olefin oxide with a cross-linking agent, the improvement which comprises adding to the mixture a compound selected from the group consisting of quinones and their derivatives of the following formula (1)

Table 4

|  | Ex. 12 | Control 6 | Ex. 13 | Control 7 | Ex. 14 | Control 8 | Ex. 15 | Control 9 | Ex. 16 | Control 10 | Ex. 17 | Control 11 |
|---|---|---|---|---|---|---|---|---|---|---|---|---|
| CHR*1 | 100 | 100 | 100 | 100 | 100 | 100 |  |  |  | 100 | 100 | 100 |
| CHC*5 |  |  |  |  |  |  | 100 | 100 | 100 |  |  |  |
| Tin stearate | 2 | 2 | 2 | 2 | 2 | 2 | 2 | 2 | 2 | 2 | 2 | 2 |
| FEF Carbon*3 | 50 | 50 | 50 | 50 | 50 | 50 | 40 | 40 | 40 | 40 | 40 | 40 |
| Nickel dibutyl-dithiocarbamate*4 | 1 | 1 | 1 |  |  |  |  |  | 0.5 | 0.5 |  |  |
| Mercapto-Benzamidazole*6 |  |  |  |  |  |  |  |  | 0.5 | 0.5 | 1 |  |
| 2-mercaptoimi-dazoline*2 | 1.5 | 1.5 | 1.5 | 1.5 |  |  | 0.5 | 0.5 |  |  |  |  |
| Hexamethylene diamine carbamate*7 |  |  |  |  |  |  |  |  | 1 |  |  |  |
| Zinc ethylenebis-dithiocarbamate |  |  |  |  |  |  |  |  |  |  | 2 | 2 |
| Sulfur |  |  |  |  |  |  |  |  |  |  | 1 | 1 |
| Red lead |  |  | 5 | 5 |  |  |  |  |  |  |  |  |
| White lead |  |  |  |  | 5 | 5 |  |  | 5 | 5 | 5 | 5 |
| Magnesia | 5 | 5 |  |  |  |  |  |  |  |  |  |  |
| 2,6-dimethyl-p-benzoquinone | 1 | — |  |  |  |  |  |  |  |  |  |  |
| 2-methyl-5-isopropyl-p-benzoquinone |  |  | 1 | — |  |  |  |  |  |  |  |  |
| Trimethyl-p-benzoquinone |  |  |  |  | 2 | — |  |  |  |  |  |  |
| Pentadecyl-p-benzoquinone |  |  |  |  |  |  | 2 | — |  |  |  |  |
| 2-methyl-1,4-naphthoquinone |  |  |  |  |  |  |  |  | 2 | — |  |  |
| Diphenoquinone |  |  |  |  |  |  |  |  |  |  | 2 | — |
| Degree of corrosion of metals (100 hrs.) | 1 | 5 | 1 | 5 | 2 | 5 | 2 | 5 | 4 | 8 | 3 | 8 |

*6Nocrac MB of Ouchi Shinko Kagaku Kogyo Kabushiki Kaisha, Japan
*7Diak No. 1 of Du Pont Company

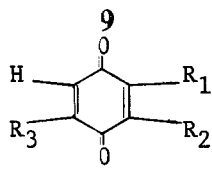

(1)

wherein $R_1$, $R_2$ and $R_3$, which may be the same or different, are each a member selected from the group consisting of hydrogen and hydrocarbon moieties, and $R_1$ and $R_2$ may together form a benzene ring.

2. The process of claim 1 wherein the compound of formula (1) is present in an amount ranging between 0.2 and 5 parts by weight per 100 parts by weight of said epichlorohydrin elastomer.

3. The process of claim 1 wherein the $R_1$, $R_2$ and $R_3$ hydrocarbon moieties in formula (1) are $C_1 - C_{20}$ alkyl moieties.

4. The process of claim 1 wherein the compound of formula (1) is a naphthoquinone.

5. The process of claim 1 wherein the cross-linking reaction is carried out at a temperature ranging between 120° and 190°C.

6. The process of claim 1 wherein the cross-linking agent is 2-mercaptoimidazoline.

7. An epichlorohydrin elastomer composition that is curable with a cross-linking agent, said composition consisting essentially of an epichlorohydrin homopolymer or copolymer with an olefin oxide and having incorporated therein 0.2 – 5 parts by weight per 100 parts by weight of the epichlorohydrin elastomer of a compound of the formula (1)

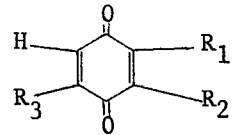

(1)

wherein $R_1$, $R_2$ and $R_3$, which may be the same or different, are each a member selected from the group consisting of hydrogen and hydrocarbon moieties, and $R_1$ and $R_2$, may together form a benzene ring.

* * * * *